United States Patent [19]

Roy et al.

[11] 4,321,280

[45] Mar. 23, 1982

[54] TEXTURED OIL SEED PROTEIN PRODUCTS

[75] Inventors: Pradip K. Roy, Ossining; Alonzo H. R. Feldbrugge, New York, both of N.Y.; David P. Bresnahan, St. Paul, Minn.

[73] Assignee: General Foods Corporation, White Plains, N.Y.

[21] Appl. No.: 856,468

[22] Filed: Dec. 1, 1977

[51] Int. Cl.$^3$ .............................................. A23J 3/00
[52] U.S. Cl. .................................... 426/276; 426/656; 426/598; 426/515; 426/802
[58] Field of Search ............... 426/104, 276, 656, 657, 426/515, 802, 598

[56] References Cited

U.S. PATENT DOCUMENTS

| | | | |
|---|---|---|---|
| 1,444,812 | 2/1923 | Thévenat | 426/598 |
| 3,175,909 | 3/1965 | Elmquist | 426/276 |
| 3,177,079 | 4/1965 | Kuromoto et al. | 426/276 |
| 3,662,671 | 5/1972 | Frederiksen et al. | 426/802 |
| 3,864,502 | 2/1975 | Sakita et al. | 426/276 X |
| 3,886,299 | 5/1975 | Feldbrugge et al. | 426/802 X |
| 3,987,213 | 10/1976 | Hawkins | 426/276 X |
| 4,017,646 | 4/1977 | Hoer et al. | 426/656 |

OTHER PUBLICATIONS

Hand et al. *Food Technology*, vol. 18, Dec. 1964, p. 139–142.

*Primary Examiner*—Esther M. Kepplinger
*Attorney, Agent, or Firm*—Mitchell E. Alter; Daniel J. Donovan; Thomas R. Savoie

[57] ABSTRACT

A process for preparing textured oil seed protein products is provided. The process enables the use of fat-containing oil seeds without the need for removing the fat prior to processing. According to the process, an aqueous dispersion of oil seed protein is concentrated under conditions effective to prevent any significant protein denaturation while allowing sufficient removal of water to obtain a viscous dispersion having a solids concentration of greater than 30% by weight, and is shaped by expressing the dispersion through a die and into an aqueous bath. According to a preferred embodiment, the oil seed material comprises full fat soybeans. Both fibers and films can be formed.

10 Claims, No Drawings

TEXTURED OIL SEED PROTEIN PRODUCTS

BACKGROUND OF THE INVENTION

The present invention relates to textured oil seed protein products and to an improved process for preparing them.

It is becoming increasingly apparent that the food supply on this planet is limited. It is imperative that the food industry seek out and perfect technologies which more efficiently utilize and distribute our limited food supplies. One area of concern is that, especially in the Western cultures, people are becoming overly dependent upon meat as a source of protein in their diets. This is undesirable from the standpoint of efficient utilization of world food resources and may be undesirable as well from the standpoint of individual health.

Having recogbized that the production of meat protein is a highly inefficient manner of obtaining adequate dietary protein due to the very low conversion by animals of vegetable protein into proteinaceous flesh, the processed food industry has attempted to provide a variety of meat analogs and substitutes based at least in part on vegetable protein. A variegated array of processing technologies has evolved within the past few decades. Among these are protein fiber spinning, thermo-plastic extrusion, simple layering and heat setting and other techniques. A summary of these procedures is set forth in Gutcho, *Textured Foods And Allied Products,* copyright 1973, by Noyes Data Corp., Library of Congress Catalog Number 79-188403. All of these procedures have their advantages as well as disadvantages, and there remains a real need for further process development to achieve the process efficiencies and product varieties which will be necessary to alleviate the problems associated with a relatively constant food supply and an ever-increasing population.

SUMMARY OF THE INVENTION

Accordingly, it is an object of the present invention to provide a new and alternative procedure for preparing textured protein products from oil seed materials.

It is a further object of the present invention to provide a process for preparing textured protein products from oil seed materials which eliminates the need for removing the oil prior to processing.

It is yet a further object of the present invention to provide an improved process for preparing textured oil seed protein products which is adaptable to efficient continuous processing.

Another object of the present invention is to provide a process capable of concentrating an oil seed milk to a solids content in excess of 30% by weight without significantly denaturing the protein.

These and other objects are accomplished according to the present invention which provides processes for concentrating oil seed milks and preparing textured oil seed protein products. The process for preparing textured oil seed protein products comprises the steps of concentrating an aqueous dispersion of fat-containing oil seeds under conditions effective to prevent any significant protein denaturation while allowing sufficient removal of water to obtain a viscous dispersion having a solids concentration of greater than 30% by weight, expressing the dispersion through a die and into an aqueous bath, recovering the resulting protein product, and heating the protein product to temper it and more fully coagulate the protein therein. According to a preferred embodiment, the oil seed material comprises full fat soybeans which are hydrated and washed prior to grinding. Further according to the preferred procedures of this invention, a coagulant for the protein may be added to either the viscous dispersion prior to expression or to the aqueous bath for contact with the dispersion upon expression from the die. The production of both fibers and films are contemplated as product forms.

The process for concentrating oil seed milk comprises spreading the milk into a thin film and subjecting it to decreased pressure for a period of time effective to increase the solids content to greater than 30% by weight without significantly denaturing oil seed protein present in the oil seed milk.

DETAILED DESCRIPTION OF THE INVENTION

The process of the present invention provides efficiencies and advantages which are highly pronounced in the formation of textured protein materials from oil seed protein sources. Among the oil seed protein sources which can be used are soybeans, sesame seeds, favabeans, cotton seeds, peanuts and the ordinary meal and other mechanically sub-divided portions of these sources. An advantage of the present invention is that there is no requirement for the oil to be extracted from the oil seed material prior to processing. Likewise, there is no need to remove the included carbohydrates which make up these oil seed protein materials. The process of this invention can in fact successfully operate with all of the fat and water soluble carbohydrate material, or any one of these, undiminished from the oil seed protein source in its natural state. The preferred protein source according to this invention is full-fat soybeans.

While the oil seed proteins are preferred for usage as the protein source according to the present invention, it is possible to replace a portion of the oil seed protein material with vegetable or animal protein derived from other sources. Typical of the other protein materials which can be employed are egg albumen, blood albumin, microbial protein, casein, various yeasts such as brewer's and torula yeast, single cell protein derived from petroleum based culture media, and various other protein materials selected because of their particular flavor, nutrition, or economy. It will be understood by those skilled in the art, of course, that wherever possible a protein having an amino acid profile complementary with that of the oil seed protein employed can provide significant nutritional advantages to the resulting product. Moreover, as the art is becoming increasingly aware, certain combinations of protein materials provide the best flavor balance when used at optimum ratios under optimum conditions.

The process of the present invention provides a simple and efficient manner for converting oil seed protein materials into textured protein products which can be used as is for meat substitutes or partial meat replacements in traditionally meat-oriented recipes or can be further flavored and processed to provide meat substitutes or wholly new food products which take advantage of the unique textural and nutritional properties possessed by these products. Obviously, the process of the present invention provides an endless scope of possibilities as to specific processing techniques and end usages. To aid in simplifying the present discussion while avoiding any serious omissions of pertinent disclosure not readily available to those skilled in the art, the following description will center around the use of soybeans as the oil seed protein source.

The initial stages of the preferred process of this invention relate to the formation of what is known in the art as soymilk which typically has a solids content within the range of from about 3 to 9%. In preparing the soymilk, whole soybeans are preferably soaked in water for a period of time sufficient to thoroughly hydrate and soften the beans. Typically, this will entail soaking the soybeans in a large excess of water for a period of time of from about 2 to about 24 hours, typically 8 to 12 hours. Good results are generally achieved with water to soy ratios on the order of from about 1:1 to about 10:1, typically 2:1 to 5:1 with the water being at a temperature of from about 2° C. to about 95° C., typically 4°–15° C. After the soybeans have been properly hydrated they are washed with water to remove solubles which have been leached but remain on the surface of the beans. The hydrated and washed beans are then ground with a large excess of hot water. Preferably, the water will be at a temperature of from about 30° to about 95° C. and the water will be present at a ratio to the soy of from about 8:1 to about 10:1. To complete the preparation of the soymilk, the insolubles are removed. While the prior art suggests sterilizing the remaining aqueous dispersion to protect against bacteriological deterioration during any extended period of storage, we have found that the milk cannot be heat sterilized if the proper solids concentration is to be achieved.

Incorporated herein by reference are the following publications directed to the preparation of soymilk: Hand et al., Pilot-Plant Studies on Soymilk, *Food Technology*, Dec. 1964, pp. 139–142; Lo et al., Yields of Extracted Solids in Soymilk as Affected by Temperature of Water of Various Pre-Treatments of Beans, *Food Technology*, Oct. 1968, pp. 120–122.

The soymilk or aqueous dispersion prepared in this or other suitable manner must then be concentrated according to the present invention to provide a concentrated dispersion having a solids content of greater than 30% and preferably greater than 35% by weight. The concentration procedure must be carried out under conditions effective to prevent any significant protein denaturation while allowing sufficient removal of water to obtain a viscous dispersion having a solids concentration of at least 30%, preferably 35% by weight and more preferably greater than about 40% by weight. To concentrate without significantly denaturizing the protein is of critical importance to this invention and relies upon the use of moderate temperatures to increase the vapor pressure of the water in the dispersion and reduced pressure to accelerate the rate of evaporation.

One preferred method for concentrating according to the present invention employs a Centri-Therm evaporation which is operated at a temperature within the range of from about 20° to about 40° C. and at an absolute pressure of from about 17.5 to about 55.3 millimeters of mercury. One reference describing the operation of evaporators of this type is: Shin, the Centri-Therm Evaporator and Its Application to Heat Sensitive Foods, *J. Appl. Chem. Biotechnology*, 1971, Vol. 21. December. This publication is incorporated herein by reference.

In concentrating the soymilk or dispersion according to this invention and employing the Centri-Therm evaporator, the dispersion is fed into the device which then centrifugally spreads it to a thin film over the outside of a conical surface. The film is heated on one surface while it is being subjected to reduced pressure on the other. The centrifugal force causes the thin film to flow from the feed end of the evaporator to the discharge end where it has achieved a sufficiently high solids concentration while not having been subjected to sufficiently elevated temperatures for periods of time which would cause any significant denaturization of the protein. The rate at which the soymilk is metered into the evaporator and gravity also affect film thickness and concentration. The time for the liquid to pass the cone and be concentrated to the desired degree is typically less than a second.

While the Centri-Therm evaporator is presently the preferred device for affecting the concentration, any other piece of evaporation equipment which is capable of reaching the necessary high solids content without significantly denaturing the protein can also be employed. The resulting viscous dispersion has the properties of a paste or a gel at this time and will typically exhibit a Brookfield viscosity, as measured on a Brookfield HAT Viscometer, using a number 4, number 5, or number 6 spindle at 100 RPM, of at least about 800 centipoises (apparent).

A particular advantage of the present invention and the use of the Centri-Therm evaporator in particular, is that the viscous dispersion can be effectively deaerated during concentration. Another advantage is that the prior art has heretofore been unable to prepare oil seed protein from an oil seed milk, such as soymilk, at concentration above 30% by weight without the addition of cleaving agents. This particular advantage is therefore considered to be a primary finding of the present invention.

The viscous dispersion resulting from the concentration of the soymilk is then shaped by expressing it through a die into an aqueous bath. Depending upon the desired visual, and to some extend textural, characteristics of the end product, the die may be so designed as to provide either film or fiber shapes. Likewise, depending upon these as well as other criteria, the shaped product can be either film or fiber shapes. Likewise, depending upon these as well as other criteria, the shaped product can be either continuously removed from the die face and through the bath or it can be allowed to fall upon previously expressed product to form a matted product configuration. Both the continuously withdrawn and the matted fiber configuration have their visual and textural advantages depending upon the particular end use contemplated.

There are a number of variables in the preparation of the texturized oil seed protein products of the present invention which play a significant role in the qualities of the products produced. It has been for example that the viscosity and concentration of the dispersion are controlling factors in the formation of structurally sound products. If the viscosity is not great enough under the conditions employed, voids or fractures in the product may occur. Moreover, where very low viscosities are employed, the dispersion will totally disperse in the bath prior to any coagulation. Where the fluid in the bath can damage the product in any way prior to coagulation, the concentration and viscosity of the dispersion should be increased. Where concentration of the soymilk is not carried out to the proper degree, the fibers will either be too soft or no fibers in fact will be formed. For example, tests have shown that dispersion concentrations of 21 and 26% solids result in products which simply disperse in solution and, solids concentration toward the lower end of the limiting lower solids concentration, say 38 or 37% solids, result in very soft fibers. While these may be suitable for some purposes, fibers produced at solids concentrations of below 30% will certainly not be suitable for any use considered to be as a meat analog or meat replacement. Higher solids concentrations, on the other hand, say 40% and more preferably 45 to 50% by weight of the viscous dispersion, show very good fiber formation and exhibit rubbery and elastic properties. These products exhibit the proper resistance to bite and the proper degree of chew to form realistic meat substitutes.

Also important variables are the concentration, pH and temperature of the bath into which the viscous dispersion is expressed. For example, it has been found that at near-neutral and alkaline pH's, the products formed, indeed if any product forms at all, will be too soft and mushy unless an effective coagulant is employed in the bath. When operating at near-neutral or alkaline conditions, coagulants such as sodium hydroxide and $KH_2PO_4$; citric acid, $Na_2HPO_4$ plus $KH_2PO_4$; and citric acid and $Na_2HPO_4$, should be employed. Typically, the concentration of these coagulants will vary from about 2 to about 15%, but the exact concentrations will depend upon the other process variables as well as the final properties desired in the product. The most desirable products made to date have employed coagulants in the aqueous bath with the bath pH maintained at from near neutral to slightly acid. For example, pH's of from about 4 to 5 have been found to yield good fibers which are rubber and strong when the bath contained gluconic acid D-lactone, acetic acid/sodium acetate buffer or citric acid/sodium citrate buffer. Also good as a bath coagulant was a solution of 10% calcium acetate. At a near-neutral pH of about 7, good fibers having rubbery strong characteristics were achieved with a bath having a 5% concentration of calcium gluconate. Presently, the pH range of from about 4 to about 5 appears to be most desirable in terms of structurally sound, strong, elastic products. However, pH's of 2 to 3 and 6 to 10 have also yielded good though somewhat less desirable products. Fibers produced with excessively low and excessively high pH's, on the other hand, have been unsuccessful in producing good fiber properties.

As with the composition and pH of the bath, the temperature of the bath is also important with the temperature range of from about 75° to about 100° C. being most advantageous. Lower temperatures, that is on the order of from about 25° to about 50° C. do provide structurally sound fibers but they are not as strong and resilient as those produced at the higher temperature levels.

While the process conditions and variables mentioned above play strong and significant roles in the successful performance of the present invention, it is absolutely essential that the fibers or films found under whatever combination of conditions from those suggested above, be autoclaved to achieve the optimum product properties. By autoclaving it is simply meant that the produce be held under moist heat and elevated pressure for a period of time effective to thoroughly heat and temper the product and more fully coagulate the protein therein. Typically, heating at a temperature above about 100° C. with steam at a pressure of at least about 1.0 kg/cm$^2$ for a period of time at least five minutes will provide a degree of product improvement. Increasing the autoclave times, temperatures or pressures tends to give tougher, more rubbery and darker final products. Thus, by varying the final conditions for autoclaving, final adjustments in product characteristics can be accomplished. This provides a degree of process control which can make the difference between an acceptable and an unacceptable process run.

Also a variable to consider when performing the process of the present invention is the adjustment of the composition of the viscous dispersion itself prior to expression into the bath. Various adjustments to the viscous dispersion have been made and have been shown to provide the possibility of modifying product properties by pre-treatment. For example, adjusting the pH of a viscous dispersion of soy protein as prepared above to a pH of about 4 and expressing the dispersion into 80° C. hot water not containing any coagulants has resulted in good rubbery fibers having good strength but not as strong as the best fibers discussed above which were produced by expressing the viscous dispersion into a coagulant bath adjusted to a pH of from 4 to 5. In another variation, acetaldehyde was added to the viscous soy dispersion which was then expressed into a bath maintained at 80° C. and pH 4 which contained gluconic acid D-lactone. The resulting fibers were strong with a light red color.

In addition to the above treatments to the viscous dispersion and the baths mentioned above, it should be borne in mind that both the viscous dispersion and the bath can contain flavoring and nutritional supplementing materials which it is desired to have present in the final product. Among these are the well known condiments and flavorings such as natural and synthetic meat flavors, hydrolyzed vegetable protein, spices, flavor oil, sodum chloride, sodium guanylate, sodium inosinate, monosodium glutamate, various amino acids, various free fatty acids, vitamins and minerals. A particular virtue of the process of this invention is that the oil soluble colors, flavors and nutrients which might desirably be added, are effectively incorporated within the viscous dispersion prior to expression into the bath by virtue of their ability to be solubilized in the oil which is the natural oil content of the oil seed material.

After their formation according to the process of this invention, the resulting products can be dried or otherwise processed and employed as any of those prior art products in the manufacture of meat analogs or as components in meat analogs or natural meat-containing products.

The following examples are set forth for the purpose of further explaining and illustrating the present invention and are not to be taken as limiting in any regard. Unless otherwise indicated, all parts and percentages are by weight.

EXAMPLE I

One part of whole soybeans is soaked in three parts of water maintained at a temperature of 4° C. for a period of 18 hours. The hydrating water is then decanted from the resulting hydrated soybeans which are then washed with water. One part of the washed beans is then added to ten parts of water of 80° C. and ground in a Homoloid Machine Type 36-3 (by W. J. Fitzpatrick Co., Chicago, Ill.) with a 1.58 mm screen. The resulting aqueous soybean slurry is then filtered to remove insoluble particles leaving an aqueous dispersion which contains about 80% of the protein originally contained in the soybeans.

The aqueous dispersion is then concentrated using a Centri-Therm evaporator operated to remove vapor at a temperature of 37.5° C. and an absolute pressure of 0.063 kg/cm$^2$. The resulting viscous dispersion exiting from the evaporator is deaerated and has a solids concentration of about 36.4%. The resulting viscous dispersion is then expressed through die having a circular orifice with a diameter of about 0.015 inches into a hot water bath maintained at a temperature of about 80° C. and a pH of 4. The resulting fibers are then collected and heat set in an autoclave maintained at a temperature of 120° C. and a gage pressure of 2.1 kg/cm$^2$ for a period of about 15 minutes. Resulting fibers have good strength and resilience.

The above description has been presented for the purpose of enabling those people skilled in the art to practice the present invention and has not attempted to describe all the possible modifications and variations of the invention which will become apparent to the person skilled in the art upon reading this disclosure. It is intended, however, that all such modifications and variations be included within the scope of the present invention which is defined by the following claims.

What is claimed is:

1. A process for preparing textured oil seed protein products which comprises: concentrating an aqueous dispersion of fat-containing oil seeds under conditions effective to prevent any significant protein denaturation while allowing sufficient removal of water to obtain a viscous dispersion having a solids concentration of greater than 30% by weight, expressing the dispersion through a die and into an aqueous bath to thereby form a fiber or film protein product, recovering the resulting protein product, and heating the protein product to temper it and more fully coagulate the protein therein.

2. A process according to claim 1 wherein the aqueous dispersion of fat-containing oil seeds is prepared by grinding fat-containing oil seed in water to prepare an aqueous dispersion and separating insoluble materials from the dispersion.

3. A process according to claim 1 wherein the aqueous dispersion is deaerated during concentration.

4. A process according to claim 1 wherein a coagulant for the protein is added to the aqueous bath.

5. A process according to claim 1 wherein a coagulant for the protein is incorporated into the viscous dispersion prior to expression from the die into the aqueous bath.

6. A process according to claim 1 wherein the oil seeds comprise full-fat soybeans.

7. A process according to claim 1 wherein the pH of the aqueous bath is within the range of from about 4 to 6.

8. A process according to claim 1 wherein viscous dispersion is concentrated to a solids content of 40% or more.

9. A process according to claim 1 wherein the viscous dispersion is concentrated to a solids content of from 45 to 50%.

10. A process according to claim 1 wherein the aqueous bath is held at a temperature above 75° C.

* * * * *